(12) United States Patent
Blunier et al.

(10) Patent No.: US 10,405,480 B2
(45) Date of Patent: Sep. 10, 2019

(54) CLOSED-LOOP DUAL-PRESSURE POSITION CONTROL OF AN IMPLEMENT STABILIZER WHEEL

(71) Applicant: CNH Industrial America LLC, New Holland, PA (US)

(72) Inventors: Timothy R. Blunier, Danvers, IL (US); Yong Deng, Peoria, IL (US)

(73) Assignee: CNH Industrial America LLC, New Holland, PA (US)

( * ) Notice: Subject to any disclaimer, the term of this patent is extended or adjusted under 35 U.S.C. 154(b) by 245 days.

(21) Appl. No.: 15/635,575

(22) Filed: Jun. 28, 2017

(65) Prior Publication Data
US 2019/0000006 A1 Jan. 3, 2019

(51) Int. Cl.
| A01B 63/22 | (2006.01) |
|---|---|
| A01B 63/00 | (2006.01) |
| A01B 76/00 | (2006.01) |
| A01B 49/02 | (2006.01) |
| A01B 73/04 | (2006.01) |

(52) U.S. Cl.
CPC ............ *A01B 63/22* (2013.01); *A01B 63/002* (2013.01); *A01B 76/00* (2013.01); *A01B 49/027* (2013.01); *A01B 73/044* (2013.01)

(58) Field of Classification Search
CPC ....... A01B 63/002; A01B 63/22; A01B 76/00; A01B 49/027; A01B 73/044; A01B 63/008; A01B 63/16; A01B 29/048; A01B 21/08; A01B 49/06; A01B 63/26; A01C 7/203; A01C 15/005; B60T 8/1708; B60T 8/17554

USPC ..... 172/1–11, 126, 127, 240, 311, 326, 327, 172/423, 688
See application file for complete search history.

(56) References Cited

U.S. PATENT DOCUMENTS

| 4,381,036 A * | 4/1983 | Fardal .................. A01C 15/005 172/127 |
|---|---|---|
| 4,669,266 A | 6/1987 | Kubik |
| 4,953,639 A | 9/1990 | Hamner et al. |

(Continued)

FOREIGN PATENT DOCUMENTS

WO 2013112109 A1 8/2013

OTHER PUBLICATIONS

Nachtewy, Peter; Closed-Loop Control Simplifies Cyclical Testing; Hydraulics & Pneumatics; Apr. 16, 2008; pp. 1-5; Penton; http://hydraulicspneumatics.com/other-technologies/closed-loop-control-simplifies-cyclical-testing.

*Primary Examiner* — Robert E Pezzuto
(74) *Attorney, Agent, or Firm* — Rebecca L. Henkel; Rickard K. DeMille (57) ABSTRACT

A remotely positionable stabilizer wheel arrangement for a towable agricultural implement utilizes a control unit that receives an input signal indicative of a desired position of the stabilizer wheel, and/or a desired depth of penetration of tillage tools operatively attached to the front and rear of the implement frame, to automatically control a hydraulic positioning cylinder of the remotely positionable stabilizer wheel arrangement to position and hold the stabilizer wheel at the desired position of the stabilizer wheel, by simultaneously controlling pressure in both the rod and base ends of the bore of the hydraulic cylinder to hold the stabilizer wheel at a target position determined from the desired position input signal.

20 Claims, 5 Drawing Sheets

(56) References Cited

U.S. PATENT DOCUMENTS

| | | | |
|---|---|---|---|
| 5,086,847 A * | 2/1992 | Meiners | A01B 63/22 |
| | | | 172/240 |
| 5,359,836 A | 11/1994 | Zeuner et al. | |
| 6,640,685 B2 | 11/2003 | Hamby | |
| 6,962,050 B2 | 11/2005 | Hiraki et al. | |
| 7,204,319 B2 * | 4/2007 | Hoehn | A01B 63/26 |
| | | | 172/311 |
| 7,222,475 B2 | 5/2007 | Bomleny et al. | |
| 7,464,770 B2 | 12/2008 | Jones et al. | |
| 7,640,874 B2 * | 1/2010 | Hoehn | A01B 49/06 |
| | | | 111/66 |
| 8,291,997 B2 * | 10/2012 | Kovach | A01B 21/08 |
| | | | 172/395 |
| 8,453,947 B2 * | 6/2013 | Martin | A01B 63/16 |
| | | | 239/163 |
| 8,528,656 B2 * | 9/2013 | Van Buskirk | A01B 29/048 |
| | | | 172/166 |
| 9,307,699 B2 * | 4/2016 | McCully | A01F 12/46 |
| 9,328,480 B2 | 5/2016 | Akiyama et al. | |
| 9,334,884 B2 | 5/2016 | Stuermer et al. | |
| 10,225,983 B2 * | 3/2019 | Kovach | A01D 67/005 |
| 2007/0175210 A1 | 8/2007 | Beck et al. | |
| 2015/0292183 A1 | 10/2015 | Hiraku | |
| 2016/0333552 A1 | 11/2016 | Kang et al. | |
| 2016/0333900 A1 | 11/2016 | Takahashi et al. | |

\* cited by examiner

CLOSED-LOOP DUAL-PRESSURE POSITION CONTROL OF AN IMPLEMENT STABILIZER WHEEL

FIELD OF THE INVENTION

This invention relates generally to towable agricultural implements such as tillage equipment and other wide implements, towed behind a towing vehicle such as a tractor, and more specifically to actively controlling positioning of stabilizer wheels utilized in such implements during operation of the implement.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

To cover large acreages as quickly and efficiently as possible, modern towable tillage implements, such as disks and field cultivators, are often very wide, with tillage widths of 22 to 47 feet being common. In order to allow such wide implements to be towed behind a towing vehicle on public roadways, these implements typically are built with frames having a central main frame section and multiple wing sections joined to the main frame by hinged joints, so that the wing sections can be folded up over the main frame section to narrow the width of the implement for transport on public roadways. In addition, the frames of such implements are also intentionally built to allow a limited amount of flexing to occur across the width of the implement during tillage operations, so that tillage tools attached to the frame can better follow variations in the terrain of the ground being tilled.

The hinged joints and inherent flexibility between the main and wing sections of the frame of such implements sometimes leads to undesirable bouncing of the wings, or an undesirable tendency of the outer edges of the tillage tools to dig deeper than desired into the ground surface, particularly while turning or maneuvering around obstacles. The wider the implement, the worse this problem becomes.

In order to counteract the tendency of wide tillage implements to undesirably bounce or dig into the ground surface, some tillage implements utilize so-called stabilizer wheels along outer extremities of the implement. These stabilizer wheels ride on or close to the ground surface, to damp any bouncing tendencies, and to provide additional support to preclude having the outer ends of the tillage tools dig too deeply into the ground surface during turning or maneuvering the wide tillage implement around obstacles during tillage operations. To improve maneuverability, such stabilizer wheels are sometimes configured to pivot during turning and maneuvering.

Generally speaking, such stabilizer wheels are properly initially adjusted to bear only lightly on the ground surface, until they come into play for reducing bouncing or digging in of the tillage tools. They do not typically function to provide primary support of the implement or primary depth control for the tillage tools. Primary support and depth control are typically provided by support and transport wheels of the implement. Having the stabilizer wheels properly positioned to bear only lightly on the ground surface typically enhances the ability of pivotable stabilizer wheels to move as desired under forces exerted by the ground surface during turning and maneuvering of the implement.

For proper operation of the implement, it is necessary for the stabilizer wheels to be positioned properly with respect to the implement frame, so that the stabilizer wheels can perform their necessary function without interfering with primary depth control and leveling of the tillage tools fore and aft, and across the width of the implement. If the stabilizer wheels are extended too far, or press too hard against the ground surface, the resulting lifting effect on the implement frame will interfere with proper operation of the tillage tools, and seedbed quality will be degraded. As changes are made to the depth of tillage, therefore, the stabilizer wheels must also be adjusted in a corresponding manner to keep the implement operating optimally.

In addition, it may be desirable to retract the stabilizer wheels during certain tillage operations and under certain operating conditions. It is also typically desirable that the stabilizer wheels be retracted prior to and during initial set up and subsequent adjustments to the operating depth and level or trim condition of the tillage tools. Following such set up and adjustments, the stabilizer wheels must be returned to a proper position and degree of ground pressure.

In the past, positioning of stabilizer wheels has typically been accomplished through the use of manually operated turnbuckles or screw jacks, by an operator or an operator's assistant standing on the ground. Alternatively, manually operated hydraulic cylinders have been used to position the stabilizer wheels on some tillage implements.

While these prior manual approaches have been successful in the past, they are cumbersome, undesirably time-consuming—particularly where an operator's assistant is needed—and, prone to adjustment error. Further improvement is desirable.

It is specifically desirable to provide an approach to positioning stabilizer wheels that can be carried out remotely by an operator seated in the towing vehicle, without the need for the operator to dismount from the towing vehicle, and without having an assistant on the ground. It is also desirable to provide an approach that allows the stabilizer wheels to be automatically, rather than manually, positioned in response to a simple command from an operator in the cab of the towing vehicle. It is further desirable that the stabilizer wheels be automatically adjusted in response to changes in depth of tillage. It is yet further desirable that an improved approach provide capability for remote, automatic and tillage-depth-responsive adjustment of stabilizer wheel position to be carried out on-the-fly, without the necessity for stopping the towing vehicle, or for the vehicle operator's attention to be diverted from overall operation of the towing vehicle to manually adjust stabilizer wheel position.

It is particularly desirable that an improved approach to remotely and automatically positioning a stabilizer wheel be readily adaptable and widely usable with older and present tractors and towing vehicles without resort to complex and costly system additions or upgrades, or reliance on communication protocols such as the emerging ISOBUS Class 3 which is not currently widely utilized in agricultural equipment.

SUMMARY OF THE INVENTION

The invention provides a remotely positionable stabilizer wheel arrangement for a towable agricultural implement that utilizes a control unit receiving an input signal indicative of a desired position of the stabilizer wheel, and/or a desired depth of penetration of tillage tools operatively attached to the front and rear of the implement frame, to control the position of the stabilizer wheel in a manner that is more precise, effective and efficient that was previously possible. A hydraulic positioning cylinder of the remotely positionable stabilizer wheel arrangement remotely positions, and then automatically holds the stabilizer wheel at the desired position of the stabilizer wheel, by simultaneously controlling pressure in both the rod and base ends of the bore of the hydraulic cylinder to hold the stabilizer wheel at a target position determined from the desired position input signal.

In one form of the invention, a remotely positionable stabilizer wheel arrangement is provided for an agricultural tillage implement having an implement frame supported above a ground surface by implement support wheels operatively connected to the frame by a depth control arrangement. The stabilizer wheel arrangement may include a support strut, a stabilizer wheel, a support strut bracket, a double-acting hydraulic cylinder, a hydraulic control arrangement, and a control unit.

The support strut has a first end adapted for mounting a stabilizer wheel on the strut. The stabilizer wheel is operatively attached to the first end of the strut, and is adapted for rolling engagement with the ground surface. The support strut bracket is adapted for attachment to the implement frame and for operative engagement with a second end of the support strut.

The double-acting hydraulic cylinder has an internal bore divided by a piston into a base end and a rod end of the bore. The cylinder also has a first end of the cylinder that is operatively attached to the support strut, and a second end that is operatively attached to the support strut bracket. The cylinder, support strut and bracket are configured and connected in such a manner that extension and retraction of the hydraulic cylinder causes a corresponding extension and retraction of the strut with respect to the strut bracket, to thereby lower and raise the stabilizer wheel into and out of contact with the ground surface.

The position sensor may be operatively connected for indicating a present position of the strut with respect to the strut bracket, and generating an electrical signal indicative of a present wheel position with respect to the strut bracket.

In some forms of the invention, the second end of the support strut and support bracket may be configured for slidable engagement of the support strut with the support bracket, and the position sensor is operatively connected for indicating a present linear position of the strut with respect to the strut bracket.

The hydraulic control arrangement may be operatively connected to both the base end and the rod end of the bore of the hydraulic cylinder for controlling extension and retraction of the cylinder in response to at least one cylinder control electrical signal.

The control unit may be configured and operatively connected to the position sensor and the hydraulic control arrangement to receive the present position signal and a desired target stabilizer wheel position input. The control unit may be further configured for providing the at least one cylinder control electrical signal to the hydraulic control arrangement, to thereby cause the hydraulic cylinder to move the stabilizer wheel to, and hold the stabilizer wheel at the target stabilizer wheel position. The control unit may also be configured to hold the stabilizer wheel at the target position by simultaneously controlling pressure in both the rod and base ends of the bore of the hydraulic cylinder.

In some forms of the invention, the control unit is configured for alternatively operating in a flow control mode for rapidly moving the stabilizer wheel into or out of a target zone disposed about the target position.

In some forms of the invention, the hydraulic control arrangement includes rod end and base end pressure control valves operatively connected for independently controlling pressure in the rod and base ends of the cylinder bore respectively in response to the at least one cylinder control electrical signal. At least one of the rod and base end pressure control valves may be an electrically operated valve, having at least a supply pressure port adapted for receiving pressurized hydraulic fluid at a supply pressure from a source of pressurized hydraulic fluid, a bypass port for returning fluid to the source of pressurized fluid, and a pressure-controlled port operatively connected for providing pressurized fluid to one of the rod and base ends of the cylinder bore.

Both of the rod and base end pressure control valves may be electrically operated valves, in some forms of the invention, with each valve having at least a supply pressure port adapted for receiving pressurized hydraulic fluid at the supply pressure from the source of pressurized hydraulic fluid, a bypass port for returning fluid to the source of pressurized fluid, and a pressure-controlled port operatively connected for providing pressurized fluid to one of the rod and base ends of the cylinder bore, the rod end valve being operatively connected to deliver fluid at a first controlled pressure to the rod end of the cylinder bore, and the base end valve being operatively connected for delivering fluid at a second controlled pressure to the base end of the cylinder.

In some forms of the invention, the position sensor may be operatively connected between the base and rod ends of the hydraulic cylinder to monitor and report a present extension length of the hydraulic cylinder, as an indication of the present position of the stabilizer wheel. In some forms of the invention, the position sensor may be integral to the hydraulic cylinder. In other forms of the invention, the position sensor may be located external to the hydraulic cylinder. In some forms of the invention, the position sensor may detect extension of the cylinder as an indicator of present position of the stabilizer wheel, whereas is other forms of the invention some other position sensing method or apparatus may be utilized for detecting a height of the implement frame above the ground, or another parameter that is indicative of the position of the stabilizer wheel.

A control unit, in some forms of the invention may sample the present position of the stabilizer wheel at a periodic rate, and command the rod and base end valves to adjust pressure in the rod and base ends of the cylinder bore respectively at the periodic rate. According to the invention, the control unit may be configured and operatively connected for determining a target position for controlling position of the stabilizer wheel by a variety of methods, including: (a) selecting a predetermined stabilizer wheel target position corresponding to a desired stabilizer wheel position input and controlling the hydraulic control arrangement using the predetermined stabilizer wheel target position; (b) computing a computed desired stabilizer wheel target position corresponding to the desired stabilizer wheel position input and controlling the hydraulic control arrangement using the computed desired stabilizer wheel target position; or, (c) making an incremental adjustment to a target position corresponding to a previous desired stabilizer wheel position.

In practicing the invention, the stabilizer wheel position may be adjustable independently from the position of the implement support wheels and the depth control arrangement.

A control unit, according to the invention may take a variety of forms including electronic, electrical and non-electrical, and analog and digital forms. In some forms of the invention, the control unit may be mounted on implement, to preclude the necessity for operation with an ISOBUS Class 3 equipped tractor. The invention may also be configured, however, for operation using the ISOBUS Class 3 protocol.

The invention may take the form of an agricultural tillage implement, or a method that includes a remotely adjustable stabilizer wheel arrangement, according to the invention.

A method, according to the invention may include holding the stabilizer wheel at the target stabilizer wheel position by simultaneously controlling pressure in both the rod and base ends of the bore of the hydraulic cylinder. Some forms of a method, according to the invention, may include simultaneously controlling the pressure in both the rod and base ends of the cylinder bore with rod end and base end electrically operated pressure control valves, according to the invention, to thereby hold the stabilizer wheel at the target stabilizer wheel position. Some forms of a method, according to the invention, may further include selectively operating the control unit in a flow control mode for rapidly moving the stabilizer wheel into or out of a target zone disposed about the target position.

A method for remotely positioning a stabilizer wheel, according to the invention, may include controlling the stabilizer wheel at a target position determined by at least one step from the group of the steps consisting of: (a) selecting a predetermined stabilizer wheel target position corresponding to a desired stabilizer wheel position input and controlling the hydraulic control arrangement using the predetermined stabilizer wheel target position; (b) computing a computed desired stabilizer wheel target position corresponding to the desired stabilizer wheel position input and controlling the hydraulic control arrangement using the computed desired stabilizer wheel target position; or (c) making an incremental adjustment to a target position corresponding to a previous desired stabilizer wheel position.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of the present invention and, together with the description, serve to explain the invention. In the drawings.

While the invention is described herein in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
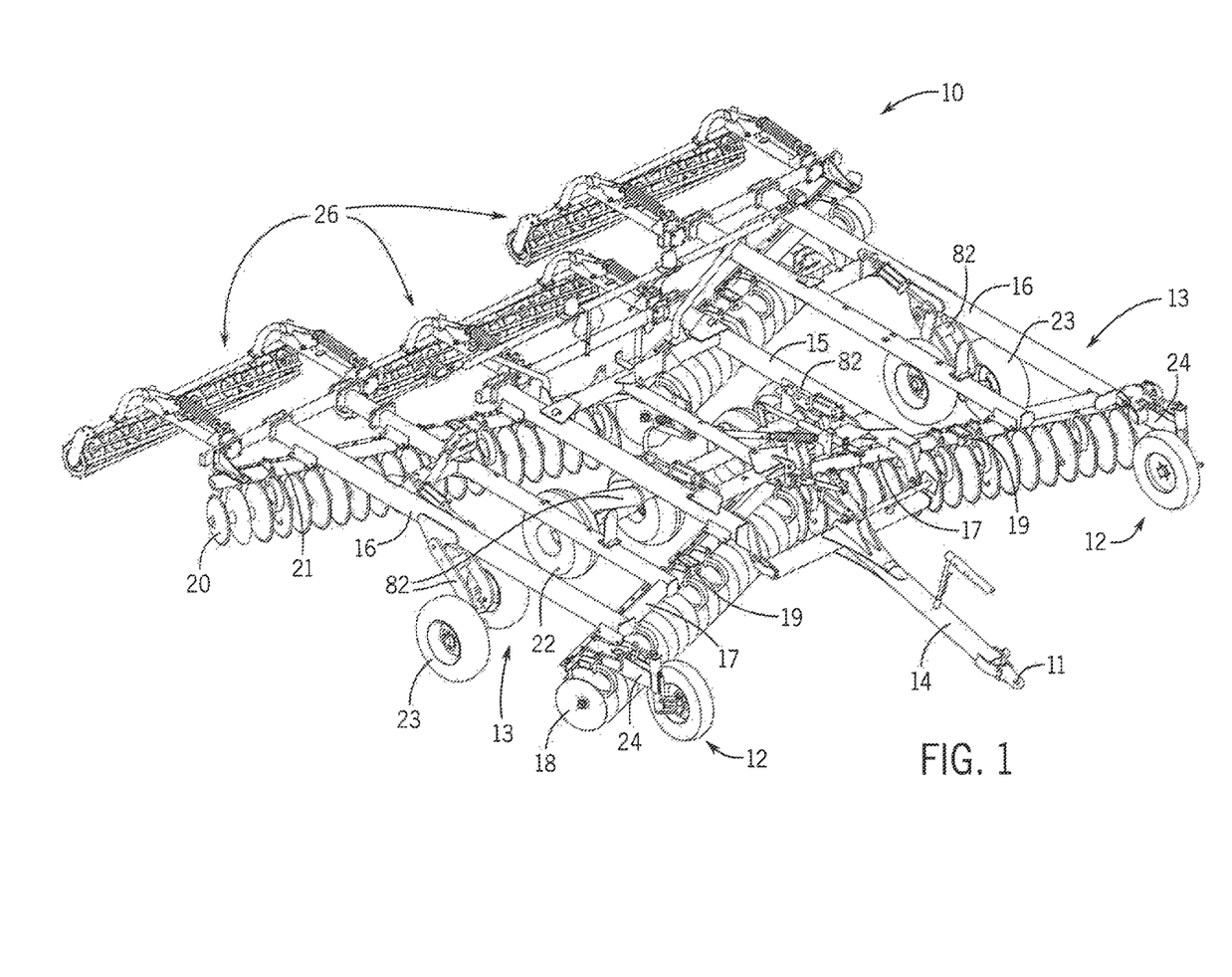
FIG. 1 is an isometric view of a towable agricultural tillage implement, according to the invention.

FIG. 1 shows an exemplary embodiment of a towable agricultural implement, according to the invention, in the form of a tandem disk 10, including a pair of left and right remotely adjustable stabilizer wheel arrangements 12,12. The disk 10 includes a hitch 14, which has a distal end 11 that is adapted for operative attachment to a towing vehicle, such as a tractor. The disk 10 has a frame 16 that includes a pair of left and right floating wings 13,13 connected to a central main section 15 of the frame 16 by a plurality of hinged joints 19. The disk 10 also includes segmented front and rear tillage tools, in the form of front and rear disk gangs 18,20, that are operatively joined to the frame 16 by front and rear segmented tool bars 17,21 respectively. The tool bars 17,21 and disk gangs 18,20 are segmented and attached to the main frame 16 and wing frames 13,13 in a manner that allows the wing frames 13,13 and the segments of the front and rear disk gangs 18,20 to be folded above the center section 15 of the frame 16, to thereby narrow the disk 10 for transport on public roadways.

Figure 2:
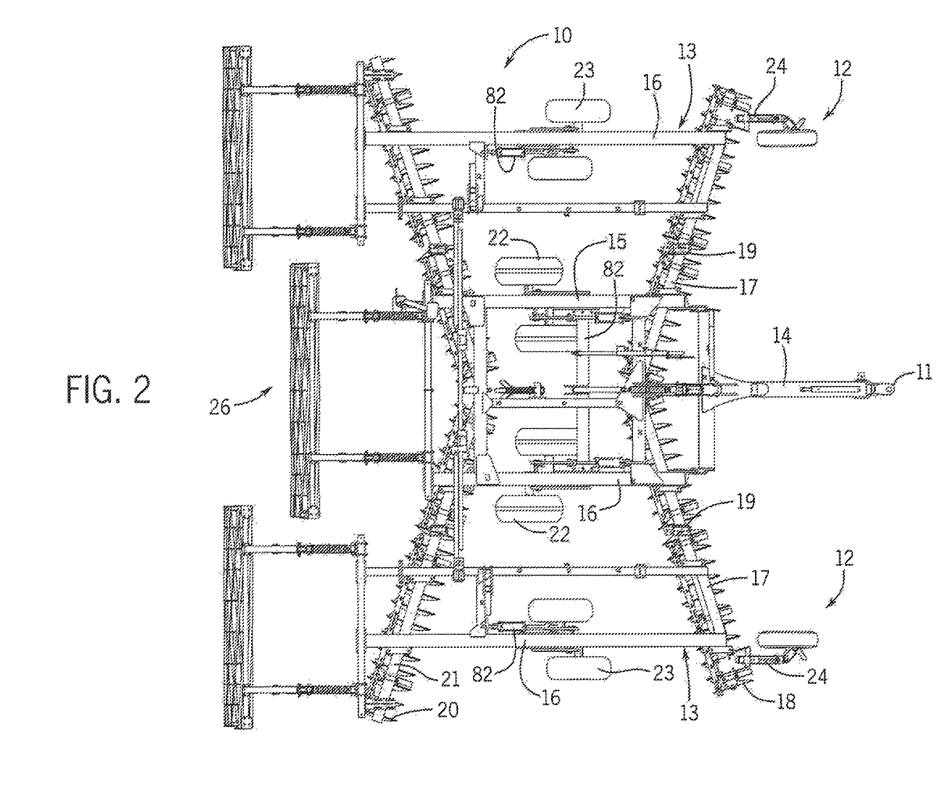
FIG. 2 is an orthographic top view of the exemplary embodiment of the implement of FIG. 1.
Figure 3:
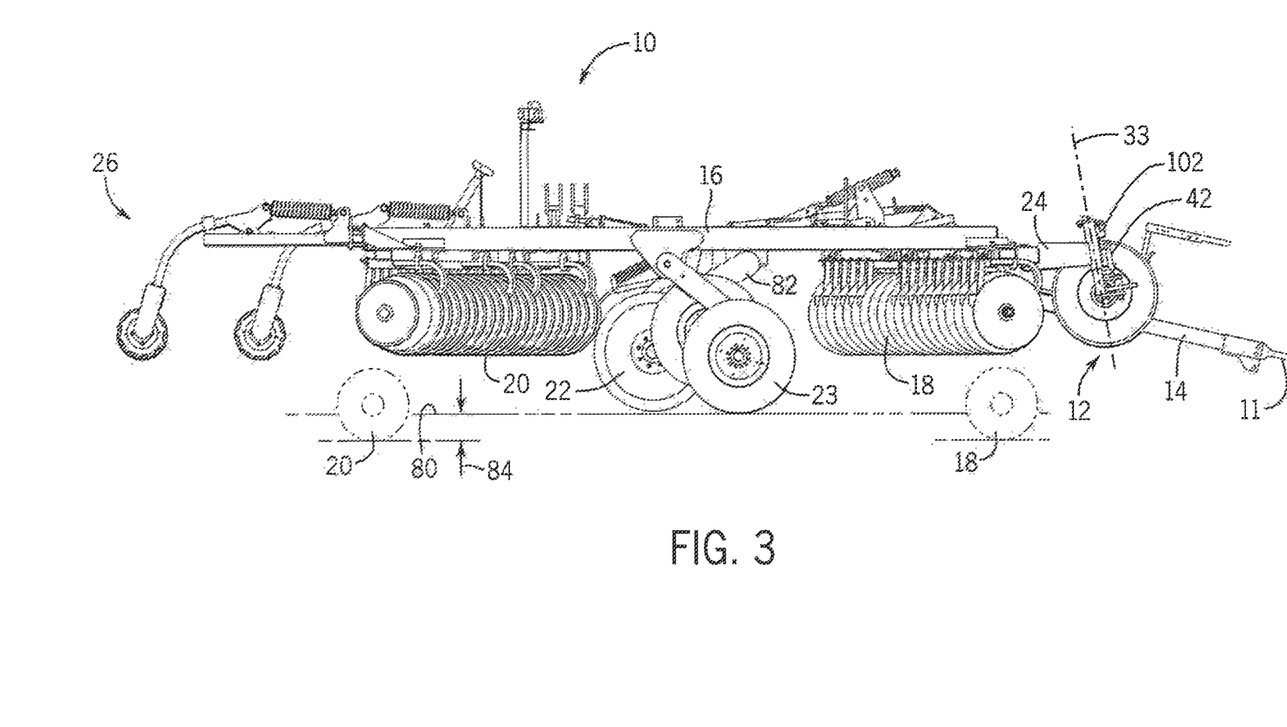
FIG. 3 is an orthographic side view of the exemplary embodiment of the implement of FIG. 1, showing the implement in a raised position for field transport, with stabilizer wheels and tillage tools of the implement raised off of the ground.

As shown in FIGS. 1-3, the disk 10 is supported above a ground surface 80 by two pairs of tandem support wheels 22,22, and right and left pairs of wing frame support wheels 23,23. The pairs of support and wing frame wheels 22,22, 23,23 are all operatively attached to the frame 16 by a common depth control arrangement 82, in a manner that allows the depth control arrangement 82 to set and maintain a depth of penetration 84 of the tillage tools 18,20 below the ground surface 80, in the manner known in the art, and as indicated schematically in FIG. 3.

Specifically, the depth control arrangement 82 is configured such that, when the wing frames 13 are lowered, as shown in FIGS. 1-3, the support wheels 22,22 and wing frame wheels 23,23 all act together to support the disk 10 above the ground surface 80. In FIG. 3, the disk 10 is shown in a raised, field transport condition, where the wheels 22,22,23,23 and depth control arrangement 82 have lifted the disk gangs 18,20 out of contact with the ground surface 80. When the wing frames 13 are lowered to a working configuration, as shown in FIGS. 1-3, and the depth control arrangement 82 is commanded to lower the disk 10 to a working position, the front and rear gangs 18,20 of tillage tools will penetrate the ground surface 80 to the depth of penetration 84, as indicated by dashed lines in FIG. 3.

The disk 10 and depth control arrangement 82 are further configured such that, when the wing frames 13,13 are raised above the main frame 15 to narrow the disk 10 for towing on a public roadway, a part of the depth control arrangement 82 attaching the transport wheels 22,22 to the main frame 15 is utilized to raise the disk 10 to a transport position, which is not illustrated in the drawings, in a manner known in the art.

As shown in FIGS. 1-3, the exemplary embodiment of the disk 10 also includes surface finishing tools, in the form of rotating crumblers 26 operatively attached to the rear of the disk 10.

As best seen in FIGS. 1 and 2, the disk 10 includes two remotely adjustable left and right stabilizer wheel arrangements 12,12 which are respectively located near the left and right front extremities of front tool bar 17. In various embodiments of the invention, the stabilizer wheel arrangements 12,12 may be operatively attached directly to the main frame 15 or wing frames 13 of the frame 16, or alternatively attached to the front tool bar 17

As discussed above, the main frame 15 and wing frames 13,13 are joined together by a plurality of hinged connections 19, that allow the wing frames 13,13 to be folded above the main frame 15. The disk 10 is further configured to utilize these hinged connections 19 in a manner that allows the wing frames 13,13 to flex with respect to the main frame 15, so that the disk gangs 18,20 can better follow the terrain and conform to the ground surface 80, as the disk 10 is towed across the ground surface 80 during tillage operations. This flexibility of the disk frame 16, together with the extensive width of modern tillage implements (22 to 47 feet of width being commonplace) can cause the wings 13,13 to bounce, under certain tillage conditions, and also contribute to the outer corners of the front disk gangs 18,20 undesirably digging too deeply into the ground surface 80, during turning or maneuvering the disk 10 around an obstacle. Accordingly, the remotely positionable stabilizer wheel arrangements 12,12 of the exemplary embodiment of the disk 10 are advantageously attached to the wing frames 13,13, or the front tool bar 17 near the front left and right front corners of the disk 10. Positioning the remotely positionable stabilizer wheel arrangements 12,12 in this manner maximizes their effectiveness in damping out wing bounce and/or undesirable digging-in of the front disk gang 18.

The stabilizer wheel arrangements 12,12 are properly adjusted to maintain only light contact pressure with the ground surface 80, until they come into operation due to a change in the terrain, so as to not interfere with operation of the depth control arrangement 82 and support and transport wheels 23,23,22,22 in maintaining a desired depth of penetration 84 of the front and rear disk gangs 18,20 below the ground surface 80. The stabilizer wheel arrangements 12,12 of the exemplary embodiment are also pivotable by interaction with the ground surface 80, to enhance overall maneuverability and operation of the disk 10. Having a light contact pressure aids in proper pivoting motion of the wheel arrangements 12,12.

FIGS. 4-7 illustrate an exemplary embodiment of the remotely hydraulically positionable stabilizer wheels 12,12, of the exemplary embodiment of the disk 10. The left and right remotely positionable stabilizer wheel arrangements 12,12 of the exemplary embodiments described herein are left and right-hand assemblies of identical groupings of component parts.

Figures 4, 5:
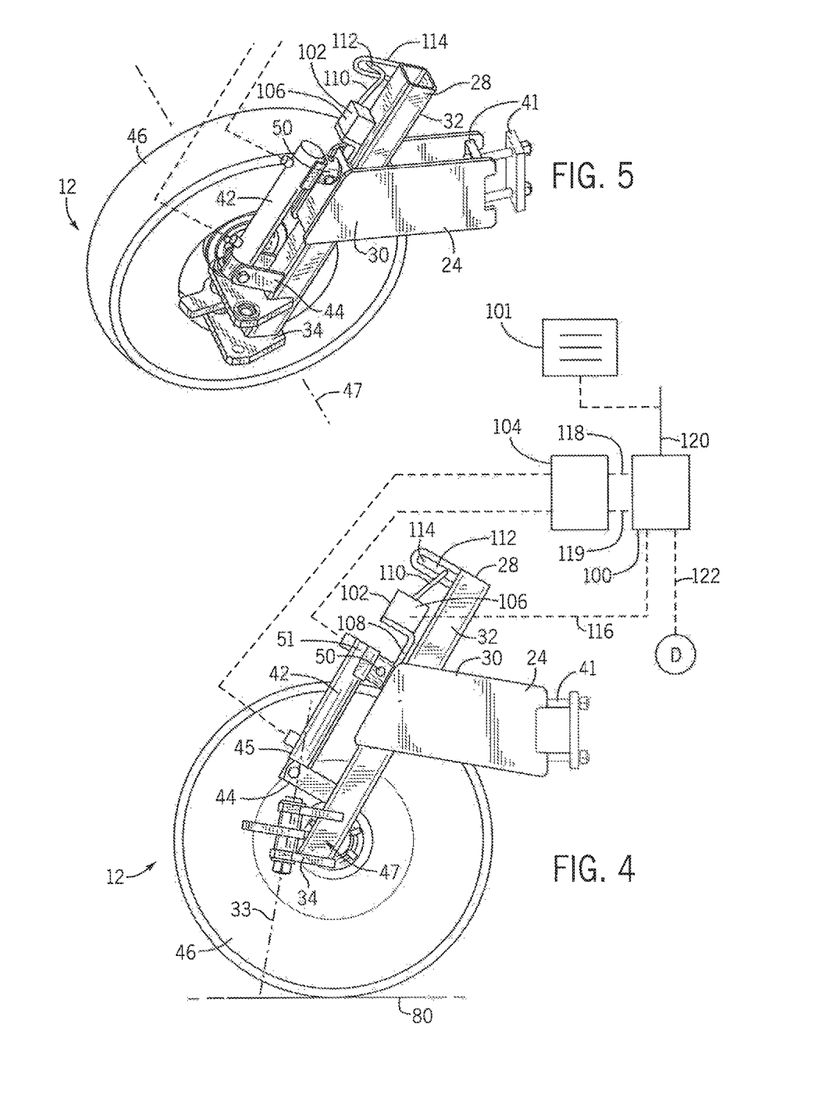
FIG. 4 is a partly schematic orthographic side view of an exemplary embodiment of a left remotely positionable stabilizer wheel arrangement, as viewed from the left front corner of exemplary embodiment of the implement of FIG. 1, with a hitch of the implement for attachment to a towing vehicle defining the front of the implement, and left and right sides of the implement being as viewed by a person standing at the rear of the implement looking forward toward the hitch.
FIG. 5 is an isometric view of a portion of the exemplary embodiment of a remotely positionable stabilizer wheel arrangement of FIG. 4.

FIGS. 4 and 5 show the left front remotely positionable stabilizer wheel arrangement 12 of the disk 10. The exemplary embodiment of the remotely positionable stabilizer wheel arrangement 12 includes a support strut 28, a support strut bracket 24, a stabilizer wheel 46, a hydraulic cylinder 42, a hydraulic control arrangement 104, a stabilizer wheel position sensor 102, and an electronic control unit 100.

The support strut 28 has a first, lower, end 34 thereof adapted for mounting the stabilizer wheel 46 to the support strut 28 in a manner that allows the stabilizer wheel 46 to roll about a substantially horizontal rotational axis 47 when the stabilizer wheel 46 is in contact with the ground surface 80. The lower end of the support strut 28 is configured to form a pivot bracket 34, and connected to the stabilizer wheel 46 in a manner that allows the wheel 46 to pivot to a limited degree about a pivot axis 33 that extends in a generally up and down, non-horizontal direction, to thereby facilitate pivoting of the stabilizer wheel 46 and maneuverability of the disk 10.

The support strut bracket 24 has a first end 41 thereof adapted for attachment to the implement frame 16, or the front tool bar 17. In the embodiments shown in FIGS. 4-5 and 8-9, the first end 41 of the support strut bracket is configured as a bolt-on clamping arrangement. In other embodiments, the first end 41 of the support strut bracket may be configured for attachment by any appropriate method, such as a through a bolting flange or by welding. The second, distal, end 30 of the support strut bracket 24 is configured for slidable engagement with a second end 32 of the support strut 28, in a manner allowing the stabilizer wheel 46 to alternatively be lowered into contact the ground surface 80, or raised out of contact with the ground surface 80.

A first, lower, end 45 of the hydraulic cylinder 42 is operatively attached to a pair of ears 44 of the pivot bracket 34 at the lower end of the support strut 28 by a pivoting pin or bolted connection. The other, upper, end thereof of the hydraulic cylinder 42 is operatively attached through a pivotable pinned or bolted connection to a second pair of ears 50 fixedly attached to the second end 30 of the support strut bracket 24. By virtue of this arrangement, the support strut 28 can be extended or retracted with respect to the strut bracket 24 by corresponding extension and retraction of the hydraulic cylinder 42, to thereby respectively lower and raise the stabilizer wheel 46 into, and out of contact with the ground surface 80.

As shown in FIGS. 4 and 5, the position sensor 102, of the remotely positionable stabilizer wheel arrangement 12 is operatively connected between the strut 28 and the strut bracket 24 for indicating a present linear position of the strut 28 with respect to the strut bracket 24, and generating an electrical signal 116 that is indicative of a present position of the stabilizer wheel 46 with respect to the strut bracket 24. In the embodiment shown in FIGS. 4 and 5, the position sensor 102 is a rotary potentiometer, having a body 106 attached to a sensor mounting bracket 108 that extends upward from and is fixedly attached to the second end 30 of the support strut bracket 24. The rotary potentiometer 102 has a rotatable arm 110 thereof, that slidingly engages an elongated slot 112 in a guide bracket 114 that is affixed to the upper end 32 of the strut 28, in such a manner that linear movement of the strut 28 with respect to the strut bracket 24 is translated into rotation of the arm 110 of the potentiometer 102 with respect to the body of potentiometer 102, to thereby cause the potentiometer 102 to generate the electrical signal 116 indicating a present position of the stabilizer wheel 46 with respect to the strut bracket 24.

It will be appreciated that once the present position of the stabilizer wheel 46 with respect to the strut bracket 24 is known, it is a matter of straightforward geometric calculation, using the dimensions of the disk 10 and the current depth of penetration being held by the depth control arrangement 82, to also determine contact, or lack of contact, of the stabilizer wheel 46 with the ground surface 80. It will also be appreciated that, in other embodiments of the invention, the position sensor 102 may take a variety of different forms, and utilize sensing elements other than a rotary potentiometer. For example, it is contemplated that other embodiments of the invention may utilize some form of a linear position sensor operatively connected between the strut 28 and the strut bracket 24, or a Hall-effect or other type of cylinder rod extension sensor built into the hydraulic cylinder 42.

As illustrated schematically in FIG. 4, the hydraulic control arrangement 104 is operatively connected to the hydraulic cylinder 42 for controlling extension and retraction of the cylinder 42 in response to cylinder control rod-end and base-end electrical signals 118,119 received from the electronic control unit 100, it is contemplated that the hydraulic control arrangement 104 may take the form of any suitable electrically controlled source of hydraulic power, available as a part of the disk 10 or in the towing vehicle. The invention provides a particular advantage, however, when the control unit 100 is mounted on the implement 10, in that interconnections and communication between the towing vehicle and the disk are simplified to the point that more complex communication and controls such as ISOBUS Class 3 are not required.

As further illustrated schematically in FIG. 4, the electronic control unit 100, of the remotely positionable stabilizer wheel arrangement 12, is further operatively connected to the position sensor 102 to receive the present stabilizer wheel position signal 116 from the position sensor 102. As further illustrated schematically in FIG. 4, the electronic control unit 100 is configured to also receive a desired stabilizer wheel position input 120 from an external source, such as a command from an operator of the towing vehicle, inputted through a touchscreen 101 or other input device located in the cab of the towing vehicle. The electronic control unit 100 is internally configured for providing the cylinder control electrical signals 118,119 to the hydraulic control arrangement 104, to thereby cause the hydraulic cylinder 42 to move the stabilizer wheel 46 to, and hold the stabilizer wheel 46 at a present stabilizer wheel position, as indicated by the position signal 116 generated by the position sensor 102, that is equal to the desired stabilizer wheel position input 120 received from the external source, or operator input.

In some forms of a remotely positionable stabilizer wheel arrangement 12, according to the invention, the control unit 100 selects a predetermined stabilizer wheel position, stored in memory of the control unit 100, corresponding to the desired stabilizer wheel position input 120 and controls the hydraulic control arrangement 104 using the predetermined stabilizer wheel position. In other forms of the invention, the control unit 100 may calculate a computed desired stabilized wheel position corresponding to the desired stabilizer wheel position input 120, and control the hydraulic control arrangement 104 using the computed desired stabilizer wheel position. For example, where the control input 120 calls for desired extension of 24 inches of the stabilizer wheel 46 with respect to the strut bracket 24, the electronic control unit will either look up a desired extension position signal 116 stored in memory, or calculate a desired present position signal 116, and then issue appropriate commands 118,119 to the hydraulic power supply 104 to cause the hydraulic cylinder 42 to drive the stabilizer wheel 46 to, and hold the stabilizer wheel 46 at a position of 24 inches, whereat the present position signal 116 matches the desired position signal 120. If a new desired position input of 23 inches is provided, the above processes would be repeated to position the stabilizer wheel 46 at the new position desired present position of 23 inches.

In some forms of the invention, the electronic control unit may be configured to position the stabilizer wheel 46 in response to a desired stabilizer wheel position input signal 120 calling for an incremental adjustment to a previous desired stabilizer wheel position. For example, where the remotely positionable stabilizer wheel 46 is currently operating at extension distance of 24 inches from the strut bracket 24, the input signal 120 may call for the extension distance to be increased by ½ inch from the present position, causing the electronic control unit 100 to calculate a new desired extension position of the stabilizer wheel at 24 ½ inches from the strut bracket 24, and control the hydraulic power unit 104 to drive the stabilizer wheel 46 to, and hold the stabilizer wheel 46 at an extension of 24 ½ inches.

As illustrated schematically in FIG. 4, in some forms of a remotely positionable stabilizer wheel arrangement 12, according to the invention, the electronic control unit 100 may be yet further configured for receiving a desired depth electrical signal 122 and computing a computed desired position of the stabilizer wheel 46, and for providing a cylinder control signal 118 corresponding to the computed desired position of the stabilized wheel to the hydraulic power unit 104, to thereby cause the hydraulic cylinder 42 to move the stabilizer wheel 46 to, and hold the stabilizer wheel 46 at the computed desired stabilizer wheel position corresponding to the desired depth signal 122. The electronic control unit 100 may be configured for selecting a predetermined stabilizer wheel position corresponding to the desired depth electrical signal 122, and controlling the hydraulic control arrangement 104 using the selected predetermined stabilizer wheel position. In some forms of the invention the control unit 100 may calculate a computed desired stabilizer wheel position corresponding to the desired depth input 122, and control the hydraulic control arrangement 104 using the computed desired stabilizer wheel position. The desired depth input 122 may indicate the desire to make an incremental adjustment to a previous desired depth of penetration 84, in some embodiments of the invention.

In embodiments of the invention utilizing a desired depth signal 122, it is contemplated that the desired depth signal 122 may be an input from a source such as an operator of the towing vehicle, or may alternatively, in some embodiments of the invention, be generated from sensors operating as part of a depth control arrangement 82, or otherwise incorporated into an embodiment of a towable tillage implement 10 according to the invention.

As indicated above, in the exemplary embodiment of the disk 10, the left and right remotely positionable stabilizer wheel arrangements 12,12, according to the invention, the first end 34 of the stabilizer wheel strut 28 is configured as a pivot bracket 34 for operatively connecting the stabilizer wheel 46 to the strut 28. The pivot bracket 34 defines a substantially horizontally extending rolling axis 47 of the stabilizer wheel 46, and also defines a non-horizontal pivot axis 33 of the stabilizer wheel 46, in such a manner that the stabilizer wheel 46 can simultaneously rotate about the rolling axis 47 and pivot about the pivot axis 33, to thereby facilitate maneuvering of the disk 10.

Figures 6, 7:
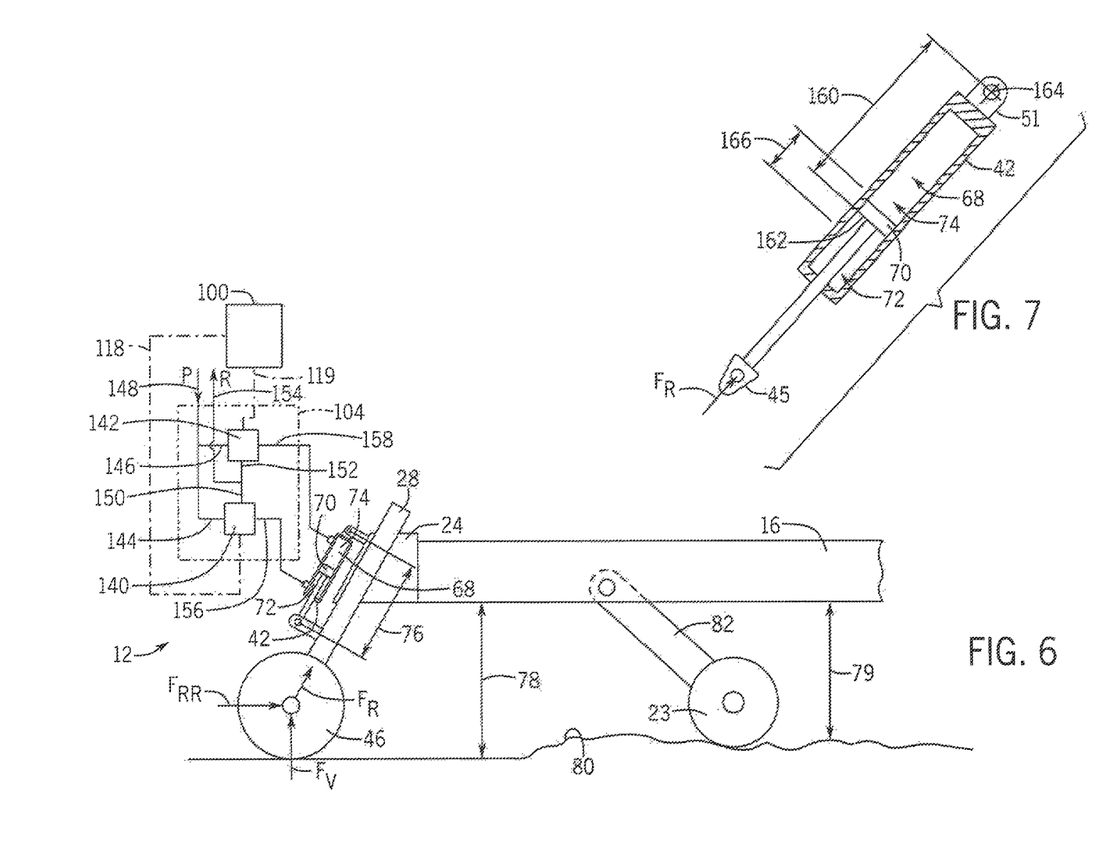
FIG. 6 is a schematic illustration showing interconnection and operation of an exemplary embodiment of a control unit and a hydraulic control unit of the remotely positionable stabilizer wheel arrangement of FIGS. 4 and 5.
FIG. 7 is an enlarged, cross-sectional view of a hydraulic cylinder of the remotely positionable stabilizer wheel arrangement of FIGS. 4-6.

As shown in FIGS. 6 and 7, the hydraulic cylinder 42 of the exemplary embodiment is a double-acting hydraulic cylinder 42 having an internal bore 68 that is divided by a piston 70 into a rod end 72 and a base end 74 of the bore 68. The cylinder 42 also has a first end 45 thereof operatively attached to the support strut 28, and a second end 51 thereof operatively attached to the support strut bracket 24 for extension and retraction of the strut 28 with respect to the strut bracket 24 by corresponding extension and retraction of the hydraulic cylinder 42 to thereby lower and raise the stabilizer wheel 46 into and out of contact with the ground surface 80.

As will be understood from an examination of FIGS. 4-6, in light of the description above, the position sensor 102 is operatively connected for indicating a present linear extension 76 of the cylinder 42, which is directly proportional to the position of the strut 28 and stabilizer wheel 46 with respect to the strut bracket 24, and generates an electrical signal 116 indicative of a present stabilizer wheel position 78 with respect to the strut bracket 24. When the stabilizer wheel 46 is engaging the ground surface 80, the present stabilizer wheel position 78 is essentially equal to the distance from the strut bracket 24 to the ground surface 80.

As shown in FIGS. 4-7, the hydraulic control arrangement 104 is operatively connected to both the base end 74 and the rod end 72 of the bore 68 of the hydraulic cylinder 42 for controlling extension and retraction of the cylinder 42 in response to a rod end cylinder control electrical signal 118 and a base end cylinder control electrical signal 119. The control unit 100 is operatively connected to the position sensor 102, as shown in FIG. 5, and to the hydraulic control arrangement 104, to receive the present position signal 116 from the position sensor 102 and a desired stabilizer wheel position input 120. In some embodiments of the invention, the desired stabilizer wheel position input is used by the control unit 100 to select or compute a target stabilizer wheel position 78, or a desired cylinder extension position 76. In other embodiments of the invention, the desired stabilizer wheel position may constitute a desired target position 160 for use by the control unit 100 in positioning and holding the stabilizer wheel 46 at a desired target position, as monitored by the position sensor 102 or another appropriate position sensor. The control unit 100 is further configured for providing the rod and base end cylinder control electrical signals 118,119 to the hydraulic control arrangement 104, to thereby cause the hydraulic cylinder 42 to move the stabilizer wheel 46 to, and hold the stabilizer wheel 46 at the target position equating to the desired stabilizer wheel position 78.

In the exemplary embodiment of the disk 10, the control unit 100 is configured to hold the stabilizer wheel 46 at the selected or computed target position by simultaneously controlling pressure in both the rod and base ends 72,74 of the bore 68 of the hydraulic cylinder 42.

As shown in FIGS. 6 and 7, the hydraulic control arrangement 104 of the exemplary embodiment includes rod end and base end pressure control valves 140,142 operatively connected for independently controlling pressure in the rod and base ends 72,74 of the cylinder bore 68 respectively, in response to the rod and base end cylinder control electrical signals 118,119. Both of the rod and base end pressure control valves 140,142 are electrically operated valves, each having a supply pressure port 144,146 adapted for receiving pressurized hydraulic fluid at the supply pressure from a source of pressurized hydraulic fluid (not shown), such as a hydraulic interface with the towing vehicle, as indicated by arrow 148 in FIG. 6. Each of the rod and base end pressure control valves 140,142 also has a bypass port 150,152 for returning fluid to the source of pressurized fluid, as indicated by arrow 154, and a pressure-controlled port 156,158 operatively connected for providing pressurized fluid the respective rod and base ends 72,74 of the cylinder bore 68. The rod end valve 140 is operatively connected to deliver fluid at a first controlled pressure to the rod end 72 of the cylinder bore 68, and the base end valve 142 is operatively connected for delivering fluid at a second controlled pressure to the base end 74 of the cylinder 42.

As indicated in FIGS. 6 and 7, the resultant force $F_R$ exerted on the cylinder 42 by stabilizer wheel 46 is substantially equal to the vector sum of a rolling resistance force $F_{RR}$, and a vertical net force $F_V$ resulting from the ground surface 80 pushing upward on the wheel 46 and the weight of the stabilizer wheel 46 and strut 28 pulling downward. The forces generated on the piston 70 by the controlled pressures in the rod end 72 and the base end 74 of the bore 68 of the cylinder 42 are adjusted to counteract the resultant force $F_R$ on the cylinder 42, to hold the cylinder 42 at a target position 160 determined by the control unit 100 to correspond to the desired position of the stabilizer wheel 46. To move the piston 70, and adjust the extension of the cylinder 42 and the position of the stabilizer wheel 46, the controlled pressures in the rod end 72 and the base end 74 of the bore 68 of the cylinder 42 are adjusted by the control unit 100 and the rod and base end pressure control valves 140,142 to either overcome or aid the resultant force FR on the cylinder 42, and move the piston 70 of the cylinder 42 toward or away from the target position 160.

In FIG. 7, the target position 160 is depicted as a linear distance of the rod-end face 162 of the piston 70 from the centerline of a hole 164 in the base end 51 of the cylinder 42, for purposes of illustration. From the foregoing description, it will be appreciated that, by virtue of the structure of the exemplary embodiment of the remotely adjustable stabilizer wheel arrangement 12, the present position of the rod-end face 162 of the piston 70 will always be directly proportional to the present position of the stabilizer wheel 46 from the strut bracket 24 and the frame 16 of the disk 10, will be further appreciated, that the present position of the rod-end face 162 of the piston 70 from the centerline of a hole 164 in the base end 51 of the cylinder 42 could be directly measured in embodiments of the invention having a position sensor built integrally into the cylinder 42.

In the exemplary embodiment, the position sensor 102 is operatively connected to measure the present position of any components that are fixedly connected to the strut 24 with respect to the strut bracket 28, and therefore provides continual monitoring to the control unit 100, via the position signal 116, of the present position of the rod-end face 162 of the piston 70, and thereby also the present position 78 of the stabilizer wheel 46.

The control unit 100 is configured to determine the desired target position 160 from the desired position input signal 120. The control unit may use any appropriate method for determining the desired target position 160 and for controlling the hydraulic control arrangement 104, such as: (a) selecting a predetermined target position 160, corresponding to the desired stabilizer wheel position input 120, from a database of the control unit 100, and controlling the hydraulic control arrangement 104 using the predetermined target position 160; (b) computing a computed target position 160 corresponding to the desired stabilizer wheel position input 120 and controlling the hydraulic control arrangement 104 using the computed target position 160; or, (c) making an incremental adjustment a target position 160 from a previous target position 160.

By comparing the present position signal 116 measured by the position sensor 102 to the target position 160, the control unit 100 can determine what commands 118,119 should be sent to the rod end and base end pressure control valves 140,142 to drive the piston 70 to, and hold the piston 70 at the target position 160. As part of this determination, the control unit 100 is configured to take into account operating parameters of the rod and base end pressure valves 140,142, and other factors such as the differential area of the base and rod faces of the piston 70, in determining what commands 118,119 are sent to the rod and base end pressure control valves 140,142 respectively. In the exemplary embodiment, the control loops for both the rod and base end valves 140,142 are closed by the present position signal 116 from the position sensor 102, to provide highly accurate control of the pressure differential across the piston 70, and highly accurate control of the position of the stabilizer wheel 36 at the target position in a manner that is considerably simpler and more effective than alternate approaches using a pair of pressure sensing arrangements for monitoring pressure in the rod and base ends 72,74 of the bore 68 of the cylinder 42.

As illustrated in FIG. 7, the control unit 100 and hydraulic control arrangement 104 of the exemplary embodiment are also configured to alternatively operate in a flow-controlled mode, to rapidly move the piston 70 into a target zone 166 disposed about the target position 160. Once the piston 70 has been moved into the target zone 166, the control unit 100 and hydraulic control arrangement 104 revert to the pressure-balance control mode described above. This allows the stabilizer wheel 46 to be retracted out of contact with the ground surface 80 during operations such as setting the tillage depth 84 with the depth control arrangement 82, or the fore-aft trim angle of the frame 16, and then be rapidly lowered back into the target zone 166 to facilitate speed in setting and holding a corresponding position 78 of the stabilizer wheel 46 in the pressure-balance control mode.

Those having skill in the art will appreciate that, through practice of the invention, the stabilizer wheel 46 can be remotely positioned, repositioned, and actively controlled to provide considerably improved functionality and performance of the stabilizer wheel 46, as compared to prior approaches for positioning such stabilizer wheels.

It will also be appreciated that the exemplary embodiment of the invention illustrates a method and apparatus for controlling the positioning 78 of a stabilizer wheel 46 independently from the action of the depth control arrangement 82 in positioning the main transport and outer carrying wheels 22,22,23,23 of the disk 10. This allows the remotely adjustable stabilizer wheel arrangement 12 to compensate to allow for the fact that the stabilizer wheel 46 will generally be in contact with an unfilled area of the ground surface 80 ahead of the tillage tools 19,20, whereas the support wheels 22,22,23,23 will generally be riding on an area of the ground surface 80 that has been least partly tilled, and may therefore be at a different position 79, with respect to the frame 16 of the disk 10 than the position 78 of the stabilizer wheel 46, with respect to the frame 16, as the stabilizer wheel 46 rides upon the unfilled area of the ground surface 80. The present invention allows precise, active control or the stabilizer wheel position 78 during operation of the disk 10 to compensate for this difference in height between the tilled and unfilled areas of the ground surface.

It will be specifically appreciated that, through use of the closed-loop dual-pressure, position controlled approach of the invention, precise positioning of a stabilizer wheel can be accomplished in a more effective and efficient manner than could be accomplished with prior approaches that rely on controlling flow of hydraulic fluid to a positioning cylinder, rather than controlling pressure on opposite sides of a piston of the cylinder as in the present invention. One the piston is moved to the target position 160, the volume of fluid transfer in and out of the bore 68 that is required to actively hold the piston 70 at the target position is very small—and, below the control capabilities of typical implement and towing vehicle flow-control-based systems. Although such low-control-based systems could conceivably be configured to control the flow of small volumes of fluid required for controlling a stabilizer wheel in an implement, considerable additional complexity and cost would be necessitated, as compared to the elegantly simple approach of the present invention.

Although the exemplary embodiments described herein and shown in the drawings are directed to an embodiment in which the second end 32 of the support strut 28 and support bracket 24 are configured for slidable engagement of the support strut 28 with the support bracket 24, and the position sensor 102 is operatively connected for indicating a present linear position of the strut 28 with respect to the strut bracket 24, those having skill in the art will appreciate that, in other embodiments of the invention other configurations and connections of the components may be utilized with efficacy. For example, in other embodiments the strut 28 may be pivotably connected to the support strut bracket 24, and the present position of the strut 28 and/or stabilizer wheel 46 may be detected by other types of position sensing apparatus or methods.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A remotely positionable stabilizer wheel arrangement for an agricultural tillage implement having an implement frame supported above a ground surface by implement support wheels operatively connected to the frame by a depth control arrangement, the stabilizer wheel arrangement comprising:
   a support strut having a first end thereof adapted for mounting a stabilizer wheel thereto;
   a stabilizer wheel operatively attached to the first end of the strut and adapted for engaging the ground surface;
   a support strut bracket adapted for attachment to the implement frame and for operative engagement with a second end of the support strut for operatively connecting the support strut to the frame;
   a double-acting hydraulic cylinder having an internal bore divided by a piston into a base end and a rod end of the bore, the cylinder also having a first end thereof operatively attached to the support strut, and a second end thereof operatively attached to the support strut bracket for extension and retraction of the strut with respect to the strut bracket by corresponding extension and retraction of the hydraulic cylinder to thereby lower and raise the stabilizer wheel in to and out of contact with the ground surface;
   a position sensor operatively connected for indicating a present position of the strut with respect to the strut bracket, arid generating an electrical signal indicative of a present wheel position with respect to the strut bracket;
   a hydraulic control arrangement operatively connected to both the base end and the rod end of the bore of the hydraulic cylinder for controlling extension and retraction of the cylinder in response to at least one cylinder control electrical signal; and
   a control unit operatively connected to the position sensor and the hydraulic control arrangement to receive the present position signal and a desired target stabilizer wheel position input, and further configured for providing the at least one cylinder control electrical signal to the hydraulic control arrangement, to thereby cause the hydraulic cylinder to move the stabilizer wheel to, and hold the stabilizer wheel at the target stabilizer wheel position;
   the control unit being configured to hold the stabilizer wheel at the target position by simultaneously controlling pressure in both the rod and base ends of the bore of the hydraulic cylinder.

2. The remotely positionable stabilizer wheel arrangement of claim 1, wherein the control unit is configured for alternatively operating in a flow control mode for rapidly moving the stabilizer wheel into or out of a target zone disposed about the target position.

3. The remotely positionable stabilizer wheel arrangement of claim 1, wherein the hydraulic control arrangement includes rod end and base end pressure control valves operatively connected for independently controlling pressure in the rod and base ends of the cylinder bore respectively in response to the at least one cylinder control electrical signal.

4. The remotely positionable stabilizer wheel arrangement of claim 3, wherein at least one of the rod and base end pressure control valves is an electrically operated valve, having a supply pressure port adapted for receiving pressurized hydraulic fluid at a supply pressure from a source of pressurized hydraulic fluid, a bypass port for returning fluid to the source of pressurized fluid, and a pressure-controlled port operatively connected for providing pressurized fluid to one of the rod and base ends of the cylinder bore.

5. The remotely positionable stabilizer wheel arrangement of claim 4, wherein both of the rod and base end pressure control valves are electrically operated valves, each having a supply pressure port adapted for receiving pressurized hydraulic fluid at the supply pressure from the source of pressurized hydraulic fluid, a bypass port for returning fluid to the source of pressurized fluid, and a pressure-controlled port operatively connected for providing pressurized fluid to one of the rod and base ends of the cylinder bore, the rod end valve being operatively connected to deliver fluid at a first controlled pressure to the rod end of the cylinder bore, and the base end valve being operatively connected for delivering fluid at a second controlled pressure to the base end of the cylinder.

6. The remotely positionable stabilizer wheel arrangement of claim 5, wherein the control unit samples the present position of the stabilizer wheel at a periodic rate and commands the rod and base end valves to adjust pressure in the rod and base ends of the cylinder bore respectively at the periodic rate.

7. The remotely positionable stabilizer wheel arrangement of claim 1, wherein the position sensor is operatively connected between the base and rod ends of the hydraulic cylinder to monitor and report a present extension length of the hydraulic cylinder, as an indication of the present position of the stabilizer wheel.

8. The remotely positionable stabilizer wheel arrangement of claim 1, wherein the control unit is configured for controlling the stabilizer wheel at a target position determined by at least one step from the group of the steps consisting of:
   a) selecting a predetermined stabilizer wheel target position corresponding to a desired stabilizer wheel position input and controlling the hydraulic control arrangement using the predetermined stabilizer wheel target position;
   b) computing a computed desired stabilizer wheel target position corresponding to the desired stabilizer wheel position input and controlling the hydraulic control arrangement using the computed desired stabilizer wheel target position; and
   c) making an incremental adjustment a target position corresponding to a previous desired stabilizer wheel target position.

9. The remotely positionable stabilizer wheel arrangement of claim 1, wherein the stabilizer wheel position is adjustable independently from the position of the implement support wheels and the depth control arrangement.

10. The remotely positionable stabilizer wheel arrangement of claim 1, wherein the second end of the support strut and support bracket are configured for slidable engagement of the support strut with the support bracket, and the position sensor is operatively connected for indicating a present linear position of the strut with respect to the strut bracket.

11. A remotely positionable stabilizer wheel arrangement for an agricultural tillage implement having an implement frame supported above a ground surface by implement support wheels operatively connected to the frame by a depth control arrangement, the stabilizer wheel arrangement comprising:
   a support strut having a first end thereof adapted for mounting a stabilizer wheel thereto;
   a stabilizer wheel operatively attached to the first end of the strut and adapted for engaging the ground surface;

a support strut bracket adapted for operative attachment to the implement frame and for slidable engagement with a second end of the support strut;

a double-acting hydraulic cylinder an internal bore divided by a piston into a base end and a rod end of the bore, the cylinder also having a first end thereof operatively attached to the support strut, and a second end thereof operatively attached to the support strut bracket for extension and retraction of the strut with respect to the strut bracket by corresponding extension and retraction of the hydraulic cylinder to thereby lower and raise the stabilizer wheel in to and out of contact with the ground surface;

a position sensor operatively connected for indicating a present linear position of the strut with respect to the strut bracket, and generating an electrical signal indicative of a present stabilizer wheel position with respect to the strut bracket;

a hydraulic control arrangement operatively connected to both the base end and the rod end of the bore of the hydraulic cylinder for controlling extension and retraction of the cylinder in response to a rod end cylinder control electrical signal and a base end cylinder control electrical signal; and a control unit operatively connected to the position sensor and the hydraulic control arrangement to receive the present position signal and a desired target stabilizer wheel position input, and further configured for providing the rod and base end cylinder control electrical signals to the hydraulic control arrangement, to thereby cause the hydraulic cylinder to move the stabilizer wheel to, and hold the stabilizer wheel at the target stabilizer wheel position;

the control unit being configured to hold the stabilizer wheel at the target position by simultaneously controlling pressure in both the rod and base ends of the bore of the hydraulic cylinder;

the hydraulic control arrangement including rod end and base end pressure control valves operatively connected for independently controlling pressure in the rod and base ends of the cylinder bore respectively in response to the rod and base end cylinder control electrical signals;

both of the rod and base end pressure control valves being electrically operated valves, each having a supply pressure port adapted for receiving pressurized hydraulic fluid at the supply pressure from a source of pressurized hydraulic fluid, a bypass port for returning fluid to the source of pressurized fluid, and a pressure-controlled port operatively connected for providing pressurized fluid to one of the rod and base ends of the cylinder bore, the rod end valve being operatively connected to deliver fluid at a first controlled pressure to the rod end of the cylinder bore, and the base end valve being operatively connected for delivering fluid at a second controlled pressure to the base end of the cylinder.

12. The remotely positionable stabilizer wheel arrangement of claim 11, wherein the control unit is configured for alternatively operating in a flow control mode for rapidly moving the stabilizer wheel into or out of a target zone disposed about the target position.

13. The remotely positionable stabilizer wheel arrangement of claim 11, wherein the control unit samples the present position of the stabilizer wheel at a periodic rate and commands the rod and base end valves to adjust pressure in the rod and base ends of the cylinder bore respectively at the periodic rate.

14. The remotely positionable stabilizer wheel arrangement of claim 11, wherein the position sensor is operatively connected between the base and rod ends of the hydraulic cylinder to monitor and report a present extension length of the hydraulic cylinder, as an indication of the present position of the stabilizer wheel.

15. The remotely positionable stabilizer wheel arrangement of claim 11, wherein the control unit is configured to control the stabilizer wheel at a target position determined by at least one method from the group of the methods consisting of:

selecting a predetermined stabilizer wheel target position corresponding to a desired stabilizer wheel position input and controlling the hydraulic control arrangement using the predetermined stabilizer wheel target position;

computing a computed desired stabilizer wheel target position corresponding to the desired stabilizer wheel position input and controlling the hydraulic control arrangement using the computed desired stabilizer wheel target position; and making an incremental adjustment a target position from a previous desired stabilizer wheel position.

16. A method for remotely positioning a stabilizer wheel arrangement of an agricultural tillage implement having an implement frame supported above a ground surface by implement support wheels operatively connected to the frame by a depth control arrangement, wherein:

the stabilizer wheel arrangement includes a support strut, a stabilizer wheel, a support strut bracket, a double-acting hydraulic cylinder, a hydraulic control arrangement, a position sensor and a control unit, with the support strut having a first end thereof adapted for mounting a stabilizer wheel thereto, the stabilizer wheel being operatively attached to the first end of the strut and adapted for engaging the ground surface, the support strut bracket being adapted for attachment to the implement frame and for operative engagement with a second end of the support strut for operatively connecting the support strut to the frame, the double-acting hydraulic cylinder having an internal bore divided by a piston into a base end and a rod end of the bore, the cylinder also having a first end thereof operatively attached to the support strut, and a second end thereof operatively attached to the support strut bracket for extension and retraction of the strut with respect to the strut bracket by corresponding extension and retraction of the hydraulic cylinder to thereby lower and raise the stabilizer wheel in to and out of contact with the ground surface, the position sensor being operatively connected for indicating a present position of the strut with respect to the strut bracket, and generating an electrical signal indicative of a present wheel position with respect to the strut bracket, the hydraulic control arrangement being operatively connected to both the base end and the rod end of the bore of the hydraulic cylinder for controlling extension and retraction of the cylinder in response to at least one cylinder control electrical signal, and the control unit being operatively connected to the position sensor and the hydraulic control arrangement to receive the present position signal and a desired target stabilizer wheel position input, and further configured for providing the at least one cylinder control electrical signal to the hydraulic control arrangement, to thereby cause the hydraulic cylinder to move the stabilizer wheel to, and hold the stabilizer wheel at the target stabilizer wheel position, with the control unit being also configured to hold the stabilizer wheel at the target position by simultaneously controlling pressure in both the rod and base ends of the bore of the hydraulic cylinder; and the method comprises hold the stabilizer wheel at the target stabilizer wheel position by simultaneously controlling pressure in both the rod and base ends of the bore of the hydraulic cylinder.

17. The method for remotely positioning a stabilizer wheel arrangement of claim 16, wherein:

the hydraulic control arrangement includes rod end and base end pressure control valves operatively connected for independently controlling pressure in the rod and base ends of the cylinder bore respectively in response to the at least one cylinder control electrical signal;

both of the rod and base end pressure control valves are electrically operated valves, each having a supply pressure port adapted for receiving pressurized hydraulic fluid at the supply pressure from the source of pressurized hydraulic fluid, a bypass port for returning fluid to the source of pressurized fluid, and a pressure-controlled port operatively connected for providing pressurized fluid to one of the rod and base ends of the cylinder bore, the rod end valve being operatively connected to deliver fluid at a first controlled pressure to the rod end of the cylinder bore, and the base end valve being operatively connected for delivering fluid at a second controlled pressure to the base end of the cylinder; and the method includes simultaneously controlling the pressure in both the rod and base ends of the cylinder bore with the rod end and base end electrically operated pressure control valves, to thereby hold the stabilizer wheel at the target stabilizer wheel position.

18. The method for remotely positioning a stabilizer wheel arrangement of claim 16, further including selectively operating the control unit in a flow control mode for rapidly moving the stabilizer wheel into or out of a target zone disposed about the target position.

19. The method for remotely positioning a stabilizer wheel arrangement of claim 16, wherein the method includes controlling the stabilizer wheel at a target position determined by at least one step from the group of the steps consisting of:

a) selecting a predetermined stabilizer wheel target position corresponding to a desired stabilizer wheel position input and controlling the hydraulic control arrangement using the predetermined stabilizer wheel target position;

b) computing a computed desired stabilizer wheel target position corresponding to the desired stabilizer wheel position input and controlling the hydraulic control arrangement using the computed desired stabilizer wheel target position; and c) making an incremental adjustment to a target position corresponding to a previous desired stabilizer wheel position.

20. The method for remotely positioning a stabilizer wheel arrangement of claim 16, wherein the second end of the support strut and support bracket are configured for slidable engagement of the support strut with the support bracket, and the position sensor is operatively connected for indicating a present linear position of the strut with respect to the strut bracket, and the method farther includes determining a present linear position of the strut with respect to the strut bracket using the position sensor.

* * * * *